United States Patent
Zhong et al.

(10) Patent No.: US 12,306,962 B2
(45) Date of Patent: May 20, 2025

(54) DATA ENCRYPTION AND DECRYPTION SYSTEM AND METHOD

(71) Applicant: MONTAGE TECHNOLOGY CO., LTD., Shanghai (CN)

(72) Inventors: Dajiang Zhong, Shanghai (CN); Zhaohui Du, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 244 days.

(21) Appl. No.: 18/148,628

(22) Filed: Dec. 30, 2022

(65) Prior Publication Data

US 2023/0222231 A1 Jul. 13, 2023

(30) Foreign Application Priority Data

Dec. 30, 2021 (CN) .......................... 202111654582.1
Jan. 7, 2022 (CN) .......................... 202210016457.6

(51) Int. Cl.
 H04L 29/06 (2006.01)
 G06F 21/60 (2013.01)
 G06F 21/85 (2013.01)

(52) U.S. Cl.
 CPC ............ *G06F 21/602* (2013.01); *G06F 21/85* (2013.01)

(58) Field of Classification Search
 None
 See application file for complete search history.

(56) References Cited

U.S. PATENT DOCUMENTS

| 6,996,725 | B2 * | 2/2006 | Ma | G06F 21/85 726/22 |
| 9,141,831 | B2 * | 9/2015 | Mundra | H04L 9/065 |
| 9,503,265 | B2 * | 11/2016 | Mundra | H04L 63/08 |
| 9,773,432 | B2 * | 9/2017 | Ghosh | G09C 1/00 |
| 2004/0181688 | A1 * | 9/2004 | Wittkotter | H04L 67/108 726/26 |
| 2021/0211279 | A1 * | 7/2021 | Nix | H04L 67/34 |

FOREIGN PATENT DOCUMENTS

| CN | 111988133 A | 11/2020 |
| CN | 109598126 B | 5/2021 |

* cited by examiner

*Primary Examiner* — Maung T Lwin
(74) *Attorney, Agent, or Firm* — Oliff PLC

(57) ABSTRACT

A data encryption and decryption system a host system, sequencer, hardware processor, direct memory access modules, and cryptography engines having input and output buffers, and symmetric encryption/decryption and digest algorithm modules. The host system determines encryption/decryption calculation and/or digest calculation method, and generates corresponding encryption/decryption and/or digest calculation commands. The sequencer analyzes the encryption/decryption and/or digest calculation commands to generate control flow commands, and controls one or more of the direct memory access modules via the control flow commands to input data to be encrypted/decrypted into the input buffer of one or more cryptography engines. The hardware processor controls the symmetric encryption/decryption algorithm module to perform encryption/decryption calculations according to the encryption/decryption calculation commands, and/or, controls the digest algorithm module to perform digest calculations on data to be encrypted/decrypted according to the digest calculation commands, and sends calculation results to the host system by the direct memory access module.

10 Claims, 2 Drawing Sheets

DATA ENCRYPTION AND DECRYPTION SYSTEM AND METHOD

REFERENCE TO RELATED APPLICATION

The present application claims priority to Chinese Application number CN2021116545821 which is filed on Dec. 30, 2021, and Chinese Application number CN2022100164576 which is filed on Jan. 7, 2022, the contents of which are incorporated herein by reference.

TECHNICAL FIELD

The present application relates to a field of information security technology, and more specifically to a data encryption and decryption system and method.

BACKGROUND

OpenSSL is an open source software library, which contains SSL and TLS. It has almost become factual standard in the field of information security, and most servers and clients use the OpenSSL cryptography toolkit. In practical applications, OpenSSL can provide dynamic engine framework to facilitate users to use cryptography device to complete hardware acceleration. The open source project corresponding to OpenSSL in China is GmSSL, which supports Chinese national cryptography standards (ShangMi), such as SM2, SM3, SM4, SM9, etc., while provides the dynamic engine framework. The users only need to implement appropriate engine interface and driver to use the cryptography device to complete the hardware acceleration of the GmSSL cryptography toolkit.

In traditional schemes for the hardware acceleration in GmSSL or similar cryptography toolkits, calculations of symmetric encryption and decryption algorithms (SM4) and digest/HMAC algorithm (SM3) are performed separately. For example, in the need for secure and reliable network transmission scenarios, during performing encryption, the encryption party needs to call SM3 to calculate digest of the plaintext, and then call SM4 to calculate ciphertext based on that plaintext and the digest of the plaintext, and transmit the ciphertext which included the digest of the plaintext to the decryption party. During performing decryption, the decryption party also needs to call SM4 to decrypt the ciphertext to obtain plaintext, and then call SM3 to calculate the digest of the plaintext so as to check the integrity of the message by verifying the digest of the plaintext. This serial and independent calculation processing method has obvious disadvantages in terms of speed.

SUMMARY OF THE INVENTION

An object of this application is to provide a data encryption and decryption system and method to improve the encryption/decryption speed and system performance of the cryptography toolkits such as GmSSL.

This application discloses a data encryption and decryption system, comprising: a host system, a sequencer, a hardware processor, multiple direct memory access modules, and multiple cryptography engines, each cryptography engine comprises an input buffer, an output buffer, a symmetric encryption/decryption algorithm module and a digest algorithm module;

wherein a command generation module of the host system determines encryption/decryption calculation method and/or digest calculation method, and generates corresponding encryption/decryption calculation commands and/or digest calculation commands;

the sequencer analyzes the encryption/decryption calculation commands and/or digest calculation commands to generate control flow commands which control the multiple cryptography engines and the multiple direct memory access modules, and controls one or more of the multiple direct memory access modules for direct memory access via the control flow commands to input data to be encrypted/decrypted into the input buffer of one or more cryptography engines of the multiple cryptography engines;

the hardware processor controls the symmetric encryption/decryption algorithm module to perform encryption/decryption calculations on the data to be encrypted/decrypted according to the encryption/decryption calculation commands, and/or, controls the digest algorithm module to perform digest calculations on the data to be encrypted/decrypted according to the digest calculation commands, and caches calculation results into the output buffer corresponding to the cryptography engine, which can be performed direct memory access by the direct memory access module corresponding to the cryptography engine to send the calculation results to a memory of the host system.

In some embodiments, the hardware processor comprises a scheduler and a command buffer, the command buffer receive the encryption/decryption calculation commands and/or digest calculation commands, and the scheduler allocates encryption/decryption tasks or digest calculation tasks to one or more encryption/decryption algorithm modules or one or more digest algorithm modules based on the encryption/decryption calculation commands and/or digest calculation commands to perform the corresponding tasks.

In some embodiments, the scheduler controls selection of direct memory access modules for data transfer transmit data, selection of cryptography engines for encryption/decryption, and selection of encryption/decryption modes for the cryptography engines.

In some embodiments, the encryption/decryption mode comprises parallel encryption/decryption methods and chained encryption/decryption methods;

wherein, during an encryption process, when the cryptography engine determines to adopt the parallel encryption method, the direct memory access module simultaneously sends data packets to be encrypted to the symmetric encryption/decryption algorithm module and the digest algorithm module, such that the symmetric encryption/decryption algorithm module and the digest algorithm module perform respective calculations on the data packets simultaneously, and respectively generate ciphertext and digest value of plaintext of the packet to be encrypted; when the cryptography engine determines to adopt the chained encryption method, the direct memory access module firstly sends the data packet to be encrypted to the symmetric encryption/decryption algorithm module to generate ciphertext of the packet to be encrypted, and the symmetric encryption/decryption algorithm module automatically sends the ciphertext to the digest algorithm module to generate digest value of ciphertext;

wherein, during a decryption process, when the cryptography engine determines to adopt the parallel decryption method, the direct memory access module simultaneously sends data packets to be decrypted to the symmetric encryption/decryption algorithm module and the digest algorithm module, such that the symmetric encryption/decryption algorithm module and the digest algorithm module perform respective calculations on the data packets simultaneously, and respectively generate plaintext and digest value of ciphertext of the packet to be decrypted; when the cryptography engine determines to adopt the chained decryption method, the direct memory access module firstly sends the data packets to be decrypted to the symmetric encryption/decryption algorithm module to generate plaintext of the packet to be decrypted, and the symmetric encryption/decryption algorithm module automatically sends the plaintext to the digest algorithm module to generate digest value of plaintext.

In some embodiments, the packet to be encrypted comprises multiple data units, if adopting the chained encryption method to encrypt the multiple data units sequentially, when the digest algorithm module calculates digest value of plaintext of a previous packet, the symmetric encryption/decryption algorithm module calculates plaintext of a next packet.

In some embodiments, the packet to be decrypted comprises multiple data units, if adopting the chained decryption method to decrypt the multiple data units sequentially, when the digest algorithm module calculates digest value of ciphertext of a previous packet, the symmetric encryption/decryption algorithm module calculates ciphertext of a next packet.

In some embodiments, when encryption of the packet is performed using the parallel encryption method, decryption of the encrypted packet is performed using the chained decryption method; and when encryption of the packet is performed using the chained encryption method, decryption of the encrypted packet is performed using the parallel decryption method.

In some embodiments, the cryptography engine further comprises an asymmetric encryption/decryption algorithm module which is coupled to the input buffer and the output buffer.

This application also disclosed a data encryption decryption method, the method is applied to a data encryption/decryption system based on the domestic cryptography algorithm, the system comprises: a host system, a sequencer, a hardware processor, multiple direct memory access modules, and multiple cryptography engines, each cryptography engine comprises an input buffer, an output buffer, a symmetric encryption/decryption algorithm module and a digest algorithm module; the method comprises:
  determining, by a command generation module of the host system, encryption/decryption calculation method and/or digest calculation method, and generating corresponding encryption/decryption calculation commands and/or digest calculation commands;
  analyzing, by the sequencer, the encryption/decryption calculation commands and/or digest calculation commands to generate control flow commands which control the multiple cryptography engines and the multiple direct memory access modules, and controlling one or more of the multiple direct memory access modules via the control flow commands to input data to be encrypted/decrypted into the input buffer of one or more cryptography engines of the multiple cryptography engines; and
  controlling, by the hardware processor, the symmetric encryption/decryption algorithm module to perform encryption/decryption calculations on the data to be encrypted/decrypted according to the encryption/decryption calculation commands, and/or, controlling the digest algorithm module to perform digest calculations on the data to be encrypted/decrypted according to the digest calculation commands, and caching calculation results into the output buffer corresponding to the cryptography engine, and performing direct memory access by the direct memory access module corresponding to the cryptography engine to send the calculation results to a memory of the host system.

In some embodiments, the method further includes:
  determining, by the hardware processor, encryption/decryption modes of the cryptography engines, wherein the encryption/decryption modes comprise parallel encryption/decryption methods and chained encryption/decryption methods;
  wherein, during an encryption process, when the cryptography engine determines to adopt the parallel encryption method, the direct memory access module simultaneously performs symmetric encryption calculation and digest calculations on packet to be encrypted of the data to be encrypted/decrypted, and respectively generates ciphertext and digest value of plaintext of the packet to be encrypted; when the cryptography engine determines to adopt the chained encryption method, the direct memory access module firstly performs symmetric encryption calculation on packet to be encrypted of the data to be encrypted/decrypted to generate ciphertext of the packet to be encrypted, and automatically performs digest calculations to generate digest value of ciphertext;
  wherein, during a decryption process, when the cryptography engine determines to adopt the parallel decryption method, the direct memory access module simultaneously performs symmetric decryption calculation and digest calculation on packet to be decrypted of the data to be encrypted/decrypted, and respectively generates plaintext and digest value of ciphertext of the packet to be decrypted; when the cryptography engine determines to adopt the chained decryption method, the direct memory access module firstly performs decryption calculation on packet to be decrypted of the data to be encrypted/decrypted to generate plaintext of the packet to be decrypted, and automatically performs digest calculations to generate digest value of plaintext.

Compared to conventional technical solutions, in implementations of this application, parallel and chained calculation extensions to the hardware acceleration of such as GmSSL cryptography toolkit are implemented so that such as GmSSL cryptography toolkit have the capability of parallel and chained calculation of encryption/decryption and digest. This application has a significant performance improvement over conventional systems which can only perform encryption/decryption and digest calculations individually and serially to the hardware acceleration of such as the GmSSL cryptography toolkits, and in particular, the performance improvement is at least double after performing parallel calculation of encryption/decryption and digest.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

Explanation of Some Concepts:

GmSSL: it is an open source cryptography toolkit that supports SM2, SM3, SM4, SM9, ZUC and other domestic cryptography (national commercial cryptography) algorithms, SM2 domestic cryptography digital certificates, and SM2-based SSL/TLS security communication protocols, supports domestic cryptography hardware devices, provides programming interfaces and command line tools that satisfy domestic cryptography specifications, and can be used to build PKI/CA, secure communication, data encryption and other secure applications that conform to domestic cryptography standards. The GmSSL project is a branch of the OpenSSL project and keeps interface compatibility with the OpenSSL. Therefore, GmSSL can replace the OpenSSL component(s) in the application and enable the application to automatically have domestic cryptography security capabilities.

In order to make the objects, technical solutions and advantages of the present application more clear, embodiments of the present application will be further described in detail below with reference to the accompanying drawings.

Figure 1:
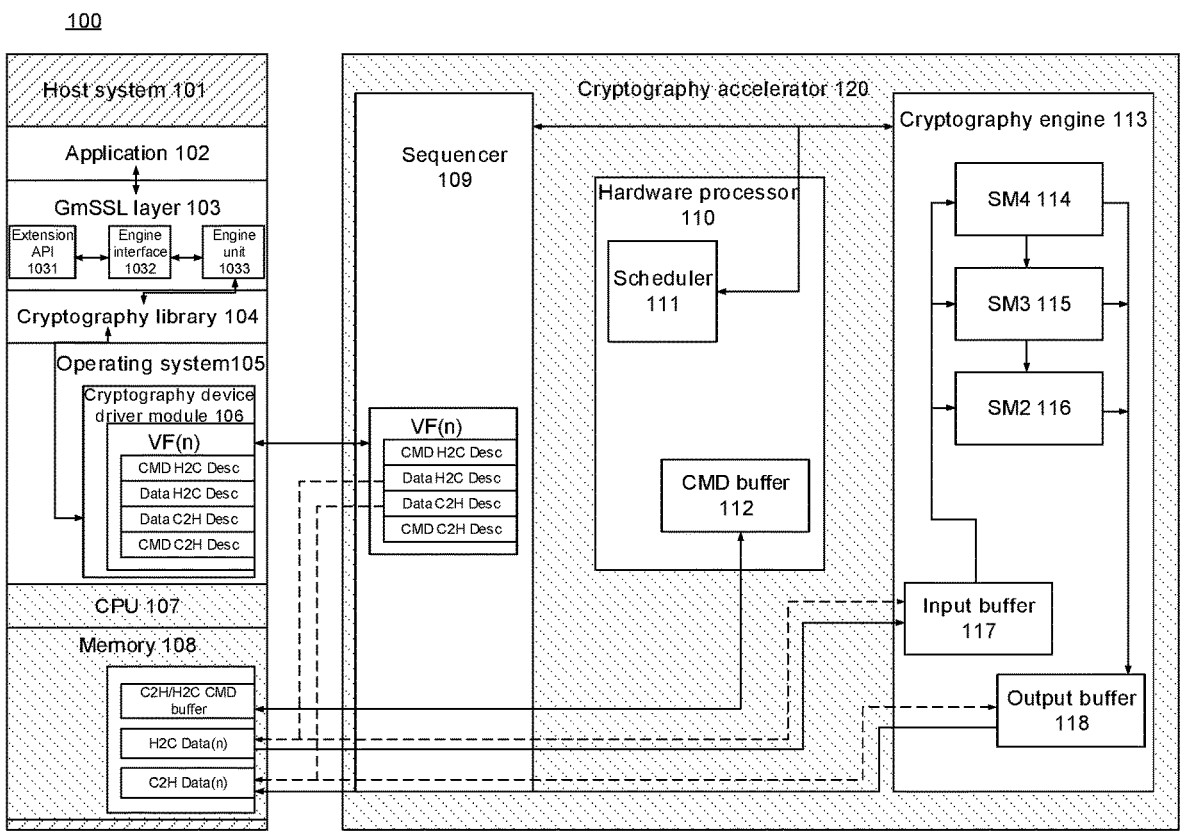
FIG. 1 is a block diagram of a data encryption and decryption system in an embodiment of the present application.

An embodiment of the present application discloses a data encryption and decryption system. FIG. 1 shows a block diagram of the data encryption and decryption system 100. The data encryption and decryption system 100 includes a host system 101 and a cryptography accelerator 120. The cryptography accelerator 120 includes: a sequencer 109, a hardware processor 110, multiple direct memory access (DMA) modules (not shown in the figure) and multiple cryptography engines 113. For simplicity, only one cryptography engine is shown in FIG. 1, but the application is not limited to this. Each cryptography engine 113 includes an input buffer 117, an output buffer 118, a symmetric encryption/decryption algorithm (SM4) module 114 and a digest algorithm (SM3) module 115. Each of the symmetric encryption/decryption algorithm (SM4) module 114 and the digest algorithm (SM3) module 115 is coupled to the input buffer 117 and the output buffer 118. In some embodiments, the cryptography engine 113 further includes an asymmetric encryption/decryption algorithm (SM2) module 116, which is coupled to the input buffer 117 and the output buffer 118. The host system 101 includes a command generation module 102, a GmSSL layer 103, a cryptography library 104, an operating system (OS) 105, a central processor (CPU) 107 and a storage (or memory) 108. Wherein, the command generation module 102 can be implemented by an application, but this application is not limited to this, and it can also be implemented by a combination of software and hardware or only by hardware. The GmSSL layer 103 includes an extension API 1031, an engine interface 1032 and an engine unit 1033. The operating system (OS) 105 includes a cryptography device driver module 106.

In an embodiment, the data encryption and decryption system of the present application can be a system based on Chinese national cryptography standards.

The above mentioned data encryption and decryption system composed of the host system 101 and the cryptography accelerator 120 has the functions of parallel calculation and/or chained calculation of symmetric encryption/decryption (SM4) and digest (SM3), That is, the data encryption and decryption system can perform these two cryptography calculations at the same time, for example, calling SM4 and SM3 to calculate ciphertext and digest simultaneously, and can also perform a cryptography calculation firstly, and then automatically perform another cryptography calculation. In addition, the cryptography device can also complete the symmetric encryption/decryption, asymmetric encryption/decryption, and digest calculations individually for cryptography toolkits such as GmSSL.

Since the present application is an enhancement to the hardware acceleration capability in such as GmSSL cryptography toolkit. Cryptographic applications are similar in use to cryptography toolkits such as GmSSL with hardware acceleration, and for common standalone cryptography algorithms (e.g., SM2, SM3, and SM4), they are used in the same manner as other systems, calling standard API in such as GmSSL cryptography toolkit. If using the parallel and chained cryptography calculation of this application, calling extension API in such as GmSSL cryptography toolkit.

For example, if the cryptographic applications need to calculate the ciphertext and the digest in parallel, then the command generation module (e.g., application 102) simply calls the corresponding extension API in such as the GmSSL cryptography toolkit. After the extension API is called, the plaintext data calls the operating system driver (e.g., cryptography device driver module 106) via the engine interface of the cryptography toolkit such as the GmSSL and controls DMA path to simultaneously transfer the plaintext data to be encrypted to the encryption/decryption algorithm (SM4) module 114 and the digest algorithm (SM3) module 115 of the cryptography engine 113, and after SM3 and SM4 operations, the resulting digest and ciphertext data is transferred to the memory of the host system 101 through the DMA path and returned to the application 102. The difference between the chained and parallel calculation is that, in the chained cryptography calculation, the data is firstly calculated inside the cryptography device for one type of cryptography, and then the obtained result is used as input for another type of cryptography. For example, in SM4, the ciphertext data is firstly calculated and then the ciphertext is automatically input into SM3 to calculate the digest, and then the ciphertext and ciphertext digest results are returned to the application 102.

The following section describes in detail the data encryption and decryption system for parallel and chained calculation.

The command generation module 102 of the host system 101 determines encryption/decryption calculation method and/or digest calculation method, and generates corresponding encryption/decryption calculation commands and/or digest calculation commands.

The sequencer 109 parses the encryption/decryption calculation commands and/or digest calculation commands to generate control flow commands which control the multiple cryptography engines 113 and the multiple direct memory access modules. The sequencer 109 controls one or more of the multiple direct memory access modules for direct memory access via the control flow commands to input data to be encrypted/decrypted into the input buffer(s) 117 of one or more cryptography engines of the multiple cryptography engines 113.

The hardware processor 110 controls the symmetric encryption/decryption algorithm module 114 to perform encryption/decryption calculations on the data to be encrypted/decrypted according to the encryption/decryption calculation commands, and/or, controls the digest algorithm module 115 to perform digest calculations on the data to be encrypted/decrypted according to the digest calculation commands, and caches calculation results into the output buffer 118 corresponding to the cryptography engine (that is, the above-mentioned cryptography engine receiving the data to be encrypted/decrypted), which can be performed direct memory access by the direct memory access module corresponding to the cryptography engine to send the calculation results to the memory 108 of the host system 101.

In some embodiments, the hardware processor 110 comprises a scheduler 111 and a command buffer 112 (that is, CMD buffer 112 in FIG. 1). The command buffer 112 receives the encryption/decryption calculation commands and/or digest calculation commands. The scheduler 111 allocates encryption/decryption tasks or digest calculation tasks to one or more symmetric encryption/decryption algorithm modules 114 and/or one or more digest algorithm modules 115 based on the encryption/decryption calculation commands and/or digest calculation commands to perform the corresponding tasks.

In some embodiments, the scheduler 111 controls selection of direct memory access modules for data transfer, selection of cryptography engines for encryption/decryption, and selection of encryption/decryption modes for the cryptography engines. Wherein, the encryption/decryption modes comprise parallel encryption/decryption methods and chained encryption/decryption methods.

During an encryption process, when the cryptography engine 113 determines to adopt the parallel encryption method, the direct memory access module simultaneously sends the data packets to be encrypted to the symmetric encryption/decryption algorithm module 114 and the digest algorithm module 115, such that the symmetric encryption/decryption algorithm module 114 and the digest algorithm module 115 can perform respective calculations on these data packets simultaneously, and respectively generate ciphertext and digest value of plaintext of the data packet to be encrypted. When the cryptography engine 113 determines to adopt the chained encryption method, the direct memory access module firstly sends the data packets to be encrypted to the symmetric encryption/decryption algorithm module 114 to generate ciphertext of the packet to be encrypted, and the symmetric encryption/decryption algorithm module 114 automatically sends the ciphertext to the digest algorithm module 115 to generate digest value of ciphertext.

During a decryption process, when the cryptography engine 113 determines to adopt the parallel decryption method, the direct memory access module sends the data packets to be decrypted to the symmetric encryption/decryption algorithm module 114 and the digest algorithm module 115 at the same time, such that the symmetric encryption/decryption algorithm module 114 and the digest algorithm module 115 can perform respective calculations on these data packets at the same time, and respectively generate plaintext and digest value of ciphertext of the packet to be decrypted. When the cryptography engine 113 determines to adopt the chained decryption method, the direct memory access module firstly sends the data packets to be decrypted to the symmetric encryption/decryption algorithm module 114 to generate plaintext of the packet to be decrypted, and the symmetric encryption/decryption algorithm module 114 automatically sends the plaintext to the digest algorithm module 115 to generate digest value of plaintext.

It should be understood that when encryption of the packet is performed using the parallel encryption method, decryption of the encrypted packet is performed using the chained decryption method; and when encryption of the packet is performed using the chained encryption method, decryption of the encrypted packet is performed using the parallel decryption method In some embodiments, the packet to be encrypted comprises multiple data units, if adopting the chained encryption method to encrypt the multiple data units sequentially, when the digest algorithm module 115 calculates the digest value of plaintext of a previous packet, the symmetric encryption/decryption algorithm module 114 calculates plaintext of a next packet. Similarly, the packet to be decrypted comprises multiple data units, if adopting the chained decryption method to decrypt the multiple data units sequentially, when the digest algorithm module 115 calculates the digest value of ciphertext of a previous packet, the symmetric encryption/decryption algorithm module 114 calculates ciphertext of a next packet.

In implementations of this application, parallel and chained calculation extensions to the hardware acceleration of such as GmSSL cryptography toolkit are implemented so that such as GmSSL cryptography toolkit have the capability of parallel and chained calculation of encryption/decryption and digest. This application has a significant performance improvement over conventional systems which can only perform encryption/decryption and digest calculations individually and serially to the hardware acceleration of such as the GmSSL cryptography toolkits, and in particular, the performance improvement is at least double after performing parallel calculation of encryption/decryption and digest.

Figure 2:
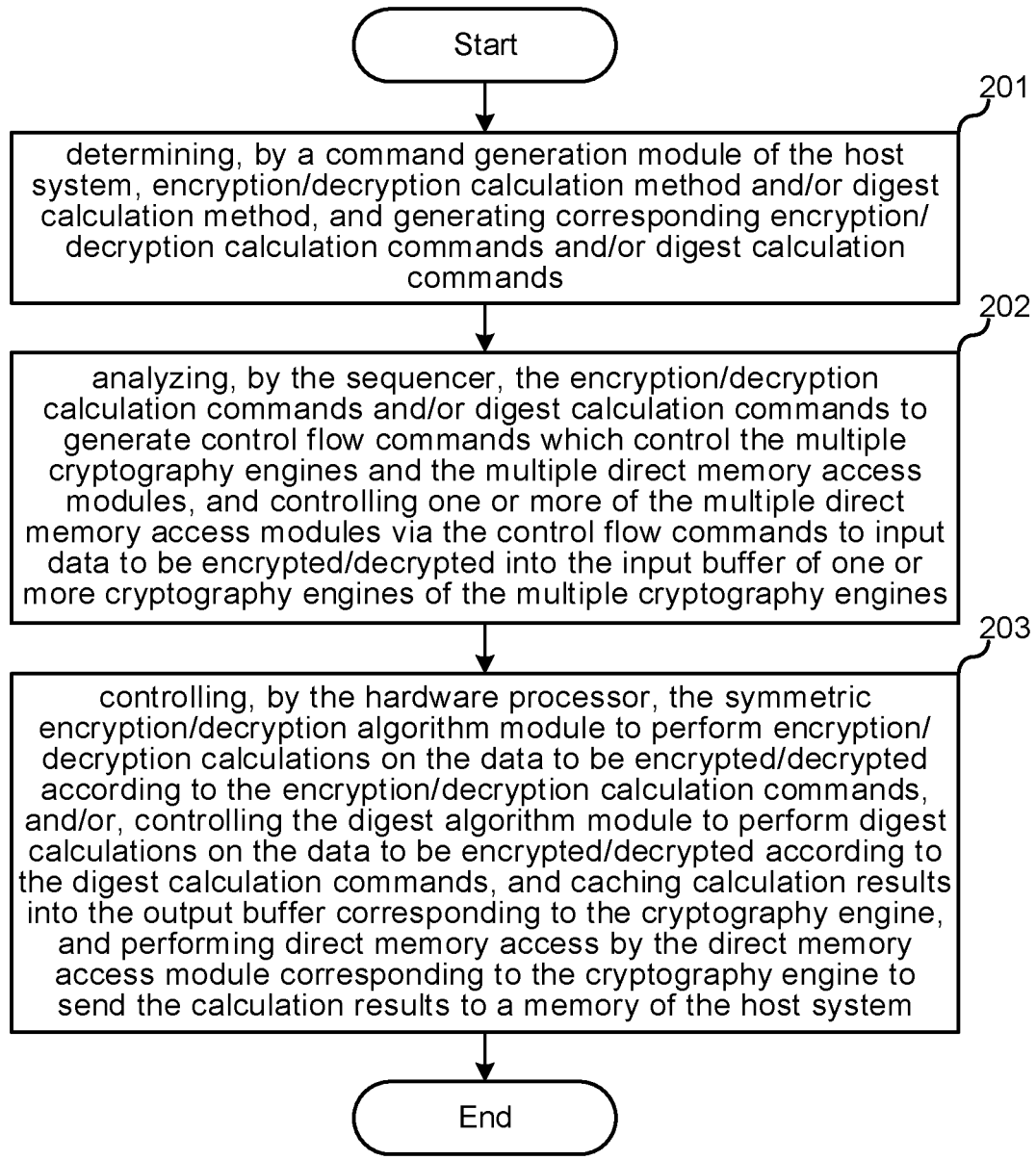
FIG. 2 is a flow chart of a data encryption and decryption method in an embodiment of the present application.

Another embodiment also discloses a data encryption and decryption method. FIG. 2 shows a flow chart of a data encryption and decryption method. The method is applied to a data encryption and decryption system as described above, the method comprises the following steps:

Step 201, determining, by a command generation module of the host system, encryption/decryption calculation method and/or digest calculation method, and generating corresponding encryption/decryption calculation commands and/or digest calculation commands.

Step 202, analyzing, by the sequencer, the encryption/decryption calculation commands and/or digest calculation commands to generate control flow commands, and controlling one or more of the multiple direct memory access modules for direct memory access via the control flow commands to input data to be encrypted/decrypted into the input buffer of one or more cryptography engines of the multiple cryptography engines.

Step 203, controlling, by the hardware processor, the symmetric encryption/decryption algorithm module to perform encryption/decryption calculations on the data to be encrypted/decrypted according to the encryption/decryption calculation commands, and/or, the digest algorithm module to perform digest calculations on the data to be encrypted/decrypted according to the digest calculation commands, and caching calculation results into the output buffer corresponding to the cryptography engine, which can be performed direct memory access by the direct memory access module corresponding to the cryptography engine to send the calculation results to a memory of the host system.

In some embodiments, the method also includes: determining, by the hardware processor, encryption/decryption modes of the cryptography engines, wherein the encryption/decryption modes comprise parallel encryption/decryption methods and chained encryption/decryption methods. Specifically, the hardware processor 110 comprises a scheduler 111 and a command buffer 112, the command buffer 112 receives the encryption/decryption calculation commands and/or digest calculation commands, and the scheduler 111 allocates encryption/decryption tasks or digest calculation tasks to one or more encryption/decryption algorithm module 114 or one or more digest algorithm module 115 based on the encryption/decryption calculation commands and/or digest calculation commands to perform the corresponding tasks. In some embodiments, the scheduler 111 controls selection of direct memory access modules for data transfer, selection of cryptography engines for encryption/decryption, and selection of encryption/decryption modes for the cryptography engines.

During an encryption process, when the cryptography engine determines to adopt the parallel encryption method, the direct memory access module simultaneously sends the data packets to be encrypted to the symmetric encryption and decryption algorithm module 114 and the digest algorithm module 115 so as to performs symmetric encryption calculation and digest calculations on these data packets and respectively generates ciphertext and digest value of plaintext of the packet to be encrypted. When the cryptography engine determines to adopt the chained encryption method, the direct memory access module firstly performs symmetric encryption calculation on packet to be encrypted of the data to be encrypted/decrypted to generate ciphertext of the packet to be encrypted, and automatically performs digest calculations to generate digest value of ciphertext.

During a decryption process, when the cryptography engine determines to adopt the parallel decryption method, the direct memory access module simultaneously sends the data packets to be decrypted to the symmetric encryption and decryption algorithm module 114 and the digest algorithm module 115 so as to performs symmetric decryption calculation and digest calculation on these data packets and respectively generates plaintext and digest value of ciphertext of the packet to be decrypted. When the cryptography engine determines to adopt the chained decryption method, the direct memory access module firstly performs decryption calculation on packet to be decrypted of the data to be encrypted/decrypted to generate plaintext of the packet to be decrypted, and automatically performs digest calculations to generate digest value of plaintext.

In an embodiment, the data encryption and decryption method of the present application can be a method based on Chinese national cryptography standards.

The above system embodiment and the method embodiment herein correspond to each other, and the relevant technical details recorded in the system embodiment can be applied to the method embodiment, and the technical details in the method embodiment can also be applied to the system embodiment, which will not be repeated here.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a/multiple elements include not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A data encryption and decryption system, comprising: a host system, a sequencer, a hardware processor, multiple direct memory access devices, and multiple cryptography engines, each cryptography engine comprises an input buffer, an output buffer, a symmetric encryption/decryption algorithm circuit (SM4), a digest algorithm circuit (SM3), and an asymmetric encryption/decryption algorithm circuit (SM2) which is coupled to the input buffer and the output buffer;

wherein a central processor (CPU) of the host system determines an encryption/decryption calculation method and/or a digest calculation method, and generates corresponding encryption/decryption calculation commands and/or digest calculation commands;

the sequencer analyzes the encryption/decryption calculation commands and/or digest calculation commands to generate control flow commands which control the multiple cryptography engines and the multiple direct memory access devices, and controls one or more of the multiple direct memory access devices for direct memory access via the control flow commands to input data to be encrypted/decrypted into one or more input buffers of one or more cryptography engines of the multiple cryptography engines;

the hardware processor controls the symmetric encryption/decryption algorithm circuit (SM4) to perform encryption/decryption calculations on the data to be encrypted/decrypted according to the encryption/decryption calculation commands, and/or, controls the digest algorithm circuit (SM3) to perform digest calculations on the data to be encrypted/decrypted according to the digest calculation commands, and caches calculation results into one or more output buffers of the one or more cryptography engines, which can be performed direct memory access by the multiple direct memory access devices corresponding to the one or more cryptography engines to send the calculation results to a memory of the host system.

2. The data encryption and decryption system according to claim 1, wherein the hardware processor comprises a scheduler and a command buffer, the command buffer receives the encryption/decryption calculation commands and/or digest calculation commands, and the scheduler allocates encryption/decryption tasks or digest calculation tasks to one or more symmetric encryption/decryption algorithm circuits (SM4s) or one or more digest algorithm circuits (SM3s) based on the encryption/decryption calculation commands and/or digest calculation commands to perform the corresponding tasks.

3. The data encryption and decryption system according to claim 2, wherein the scheduler controls selection of the direct memory access devices for data transfer, selection of cryptography engines for encryption/decryption, and selection of encryption/decryption modes for the cryptography engines.

4. The data encryption and decryption system according to claim 3, wherein the encryption/decryption modes comprise parallel encryption/decryption methods and chained encryption/decryption methods;

wherein, during an encryption process, when the cryptography engine determines to adopt the parallel encryption method, the direct memory access devices simultaneously sends data packets to be encrypted to the symmetric encryption/decryption algorithm circuit (SM4) and the digest algorithm circuit (SM3), such that the symmetric encryption/decryption algorithm circuit (SM4) and the digest algorithm circuit (SM3) perform respective calculations on the data packets simultaneously, and respectively generate ciphertext and digest value of plaintext of the data packets to be encrypted; when the cryptography engine determines to adopt the chained encryption method, the direct memory access devices firstly sends the data packets to be encrypted to the symmetric encryption/decryption algorithm circuit (SM4) to generate ciphertext of the data packets to be encrypted, and the symmetric encryption/decryption algorithm circuit (SM4) automatically sends the ciphertext to the digest algorithm circuit (SM3) to generate digest value of ciphertext;

wherein, during a decryption process, when the cryptography engine determines to adopt the parallel decryption method, the direct memory access devices simultaneously send data packets to be decrypted to the symmetric encryption/decryption algorithm circuit (SM4) and the digest algorithm circuit (SM3), such that the symmetric encryption/decryption algorithm circuit (SM4) and the digest algorithm circuit (SM3) perform respective calculations on the data packets simultaneously, and respectively generate plaintext and digest value of ciphertext of the data packets to be decrypted; when the cryptography engine determines to adopt the chained decryption method, the direct memory access devices firstly sends the data packets to be decrypted to the symmetric encryption/decryption algorithm circuit (SM4) to generate plaintext of the data packets to be decrypted, and the symmetric encryption/decryption algorithm circuit (SM4) automatically sends the plaintext to the digest algorithm circuit (SM3) to generate digest value of plaintext.

5. The data encryption and decryption system according to claim 4, wherein the data packets to be encrypted comprises multiple data units, if adopting the chained encryption method to encrypt the multiple data units sequentially, when the digest algorithm circuit (SM3) calculates the digest value of plaintext of a previous data packet, the symmetric encryption/decryption algorithm circuit (SM4) calculates the plaintext of a next data packet.

6. The data encryption and decryption system according to claim 4, wherein the data packets to be decrypted comprises multiple data units, if adopting the chained decryption method to decrypt the multiple data units sequentially, when the digest algorithm circuit (SM3) calculates the digest value of ciphertext of a previous data packet, the symmetric encryption/decryption algorithm circuit (SM4) calculates the ciphertext of a next data packet.

7. The data encryption and decryption system according to claim 4, wherein when encryption of the data packets is performed using the parallel encryption method, decryption of the encrypted data packets is performed using the chained decryption method; and when encryption of the data packets is performed using the chained encryption method, decryption of the encrypted data packets is performed using the parallel decryption method.

8. A data encryption and decryption method, the method is applied to a data encryption and decryption system, the system comprises: a host system, a sequencer, a hardware processor, multiple direct memory access devices, and multiple cryptography engines, each cryptography engine comprises an input buffer, an output buffer, a symmetric encryption/decryption algorithm circuit (SM4), a digest algorithm circuit (SM3), and an asymmetric encryption/decryption algorithm circuit (SM2) which is coupled to the input buffer and the output buffer; the method comprising:

determining, by a central processor (CPU) of the host system, an encryption/decryption calculation method and/or a digest calculation method, and generating corresponding encryption/decryption calculation commands and/or digest calculation commands;

analyzing, by the sequencer, the encryption/decryption calculation commands and/or digest calculation commands to generate control flow commands which control the multiple cryptography engines and the multiple direct memory access devices, and controlling one or more of the multiple direct memory access devices via the control flow commands to input data to be encrypted/decrypted into one or more input buffers of one or more cryptography engines of the multiple cryptography engines; and controlling, by the hardware processor, the symmetric encryption/decryption algorithm circuit (SM4) to perform encryption/decryption calculations on the data to be encrypted/decrypted according to the encryption/decryption calculation commands, and/or, controlling the digest algorithm circuit (SM3) to perform digest calculations on the data to be encrypted/decrypted according to the digest calculation commands, and caching calculation results into one or more output buffers of the one or more cryptography engines, and performing direct memory access by the direct memory access devices corresponding to the one or more cryptography engines to send the calculation results to a memory of the host system.

9. The data encryption and decryption method according to claim 8, the method further comprises:

determining, by the hardware processor, encryption/decryption modes of the cryptography engines, wherein the encryption/decryption modes comprise parallel encryption/decryption methods and chained encryption/decryption methods;

wherein, during an encryption process, when the cryptography engine determines to adopt the parallel encryption method, the direct memory access devices simultaneously performs symmetric encryption calculation and digest calculations on data packets to be encrypted of the data to be encrypted/decrypted, and respectively generates ciphertext and digest value of plaintext of the data packets to be encrypted; when the cryptography engine determines to adopt the chained encryption method, the direct memory access devices firstly performs symmetric encryption calculation on data packets to be encrypted of the data to be encrypted/decrypted to generate ciphertext of the data packets to be encrypted, and automatically performs digest calculations to generate digest value of ciphertext;

wherein, during a decryption process, when the cryptography engine determines to adopt the parallel decryption method, the direct memory access devices simultaneously performs symmetric decryption calculation and digest calculation on data packets to be decrypted of the data to be encrypted/decrypted, and respectively generates plaintext and digest value of ciphertext of the data packets to be decrypted; when the cryptography engine determines to adopt the chained decryption method, the direct memory access devices firstly performs decryption calculation on data packets to be decrypted of the data packets to be encrypted/decrypted to generate plaintext of the packet to be decrypted, and automatically performs digest calculations to generate digest value of plaintext.

10. A data encryption and decryption system, comprising:
a host system, wherein the host system further comprises a central processor (CPU) configured to:
  determine an encryption/decryption calculation method and a digest calculation method; and
  generate encryption/decryption calculation commands and digest calculation commands corresponding to the determined encryption/decryption calculation method and digest calculation method;
a cryptography accelerator that is coupled to the host system, wherein the cryptography accelerator further comprises:
  a command buffer configured to receive the generated encryption/decryption calculation commands and the digest calculation commands;
  a plurality of direct memory access devices; and
  a cryptography engine that includes a symmetric encryption/decryption algorithm circuit (SM4), a digest algorithm circuit (SM3), and an asymmetric encryption/decryption algorithm circuit (SM2); and
a scheduler configured to:
  allocate encryption/decryption tasks and digest calculation tasks to the cryptography engine based on the encryption/decryption calculation commands and the digest calculation commands; and
  control a selection of encryption/decryption modes of the cryptography engine, wherein the encryption/decryption modes comprise parallel encryption/decryption methods and chained encryption/decryption methods;

wherein, during an encryption process in a parallel encryption method allocated by the scheduler, the plurality of direct memory access devices simultaneously sends data packets to be encrypted to the symmetric encryption/decryption algorithm circuit (SM4) and the digest algorithm circuit (SM3), such that the symmetric encryption/decryption algorithm circuit (SM4) and the digest algorithm circuit (SM3) perform respective calculations on the data packets simultaneously, and respectively generate a ciphertext and a digest value of plaintext of the data packets to be encrypted; wherein, during the encryption process in a chained encryption method allocated by the scheduler, the plurality of direct memory access devices firstly sends the data packets to be encrypted to the symmetric encryption/decryption algorithm circuit (SM4) to generate a ciphertext of the data packets to be encrypted, and the symmetric encryption/decryption algorithm circuit (SM4) automatically sends the ciphertext to the digest algorithm circuit (SM3) to generate a digest value of the ciphertext;

wherein, during a decryption process in a parallel decryption method allocated by the scheduler, the plurality of direct memory access devices simultaneously sends data packets to be decrypted to the symmetric encryption/decryption algorithm circuit (SM4) and the digest algorithm circuit (SM3), such that the symmetric encryption/decryption algorithm circuit (SM4) and the digest algorithm circuit (SM3) perform respective calculations on the data packets simultaneously, and respectively generate a plaintext and a digest value of ciphertext of the data packets to be decrypted; wherein, during the decryption process in a chained decryption method, the plurality of direct memory access devices firstly sends the data packets to be decrypted to the symmetric encryption/decryption algorithm circuit (SM4) to generate a plaintext of the packet to be decrypted, and the symmetric encryption/decryption algorithm circuit (SM4) automatically sends the plaintext to the digest algorithm circuit (SM3) to generate a digest value of the plaintext.

* * * * *